Oct. 25, 1960 J. C. HESS 2,957,662
INFLATABLE ICE-REMOVAL APPARATUS FOR AIRCRAFT
Filed Feb. 17, 1956 3 Sheets-Sheet 1
Fig. 1
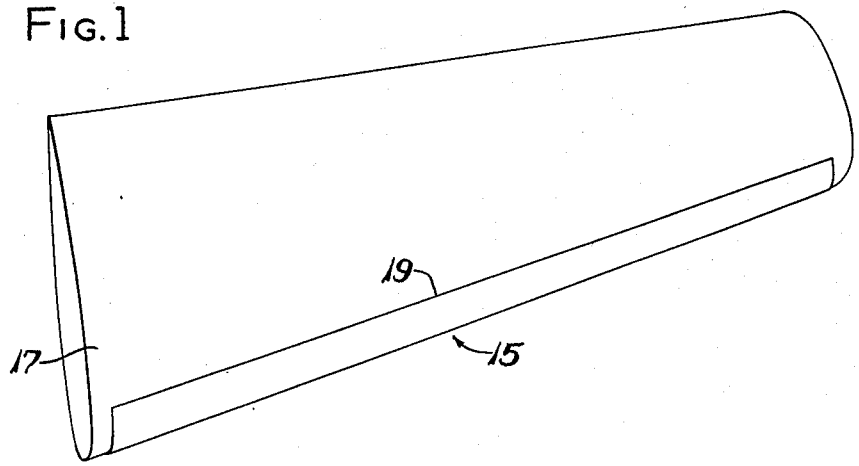
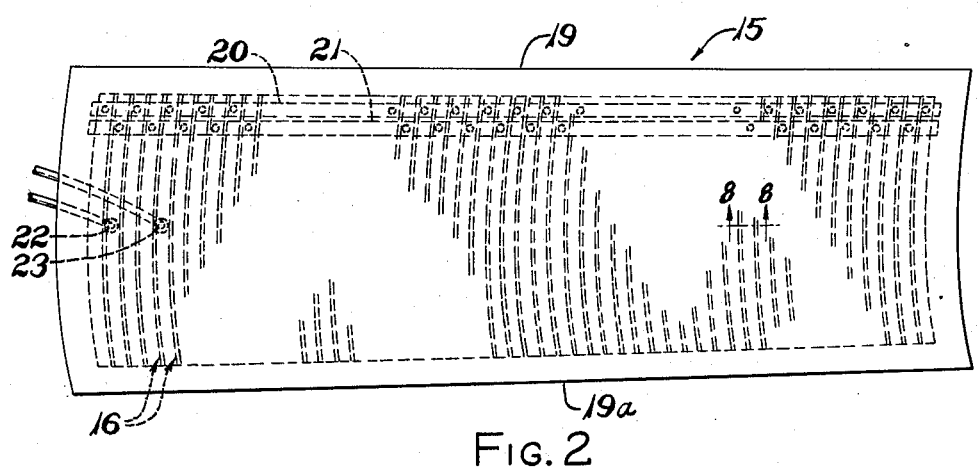
Fig. 2
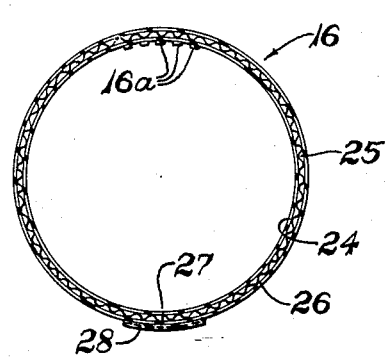
Fig. 4
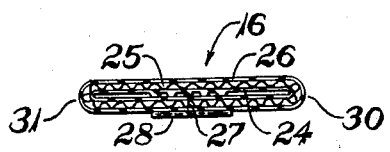
Fig. 3
INVENTOR.
JOSEPH C. HESS
BY Dwight L. Moody
ATTY.

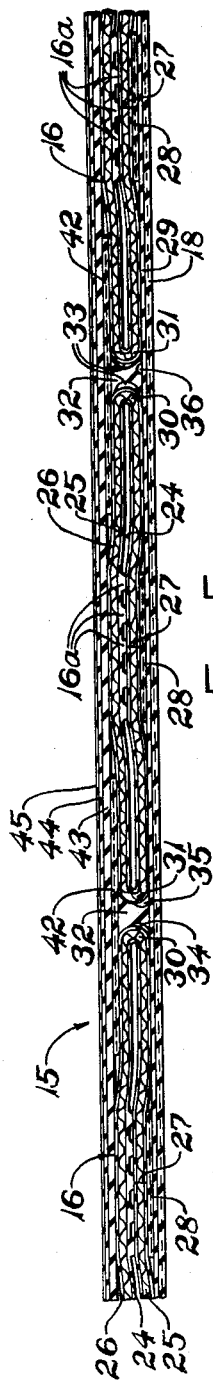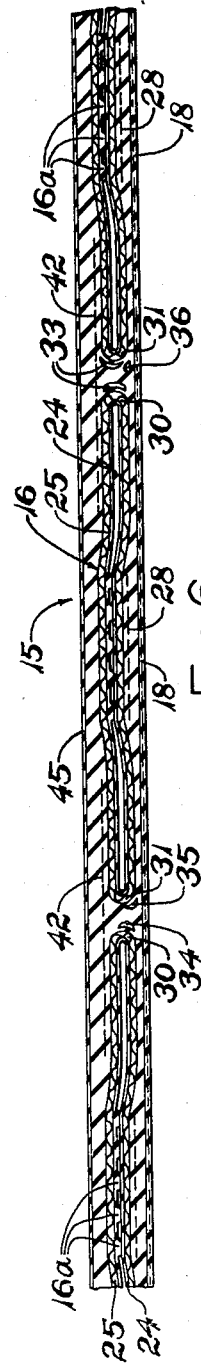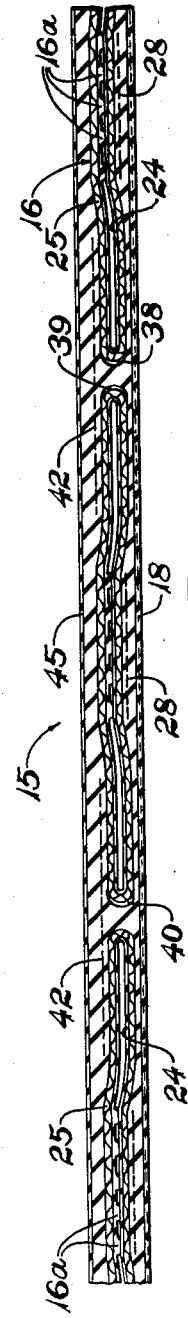

Oct. 25, 1960 J. C. HESS 2,957,662
INFLATABLE ICE-REMOVAL APPARATUS FOR AIRCRAFT
Filed Feb. 17, 1956 3 Sheets-Sheet 3
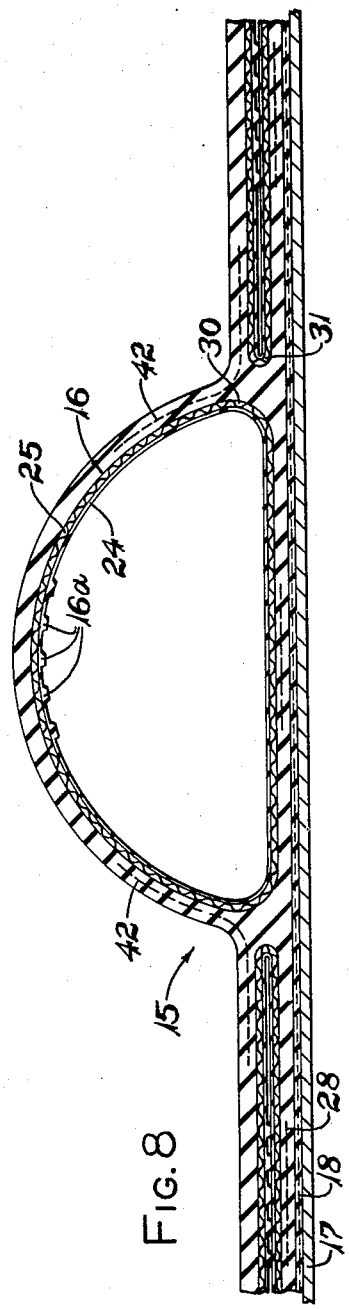
INVENTOR.
JOSEPH C. HESS
BY Dwight L. Moody
ATTY.

United States Patent Office

2,957,662
Patented Oct. 25, 1960

2,957,662

INFLATABLE ICE-REMOVABLE APPARATUS FOR AIRCRAFT

Joseph C. Hess, Cuyahoga Falls, Ohio, assignor to The B. F. Goodrich Company, New York, N.Y., a corporation of New York Filed Feb. 17, 1956, Ser. No. 566,193

6 Claims. (Cl. 244—134)

The invention relates to apparatus for removing ice deposits from surfaces when the latter are exposed to air under icing conditions and relates especially to inflatable protective coverings for airfoils and other surfaces of aircraft.

Heretofore, inflatable protective coverings of resilient rubber material with adjacent inflatable tubes therein for removing ice from aircraft wings and the like have generally required replacement after a few thousand inflations and deflations of the tubes having walls of textile fabric and resilient natural rubber, for example, because of the structural deterioration of the walls of the tubes, the shearing or tearing of the tube walls from adjacent rubber material at the margins of the tubes, and the permeability of such tube walls to the diffusion therethrough of the inflating air resulting in the formation of objectionable pockets of air under pressure within the covering. The use of small inflatable tubes of one and one-quarter (1¼) inch or less in diameter, together with their inflation by air under increased pressure i.e. about twenty (20) pounds per square inch pressure, has increased the difficulty of providing extensive service life of these coverings.

It has been found in the manufacture and vulcanization of these coverings, that atmospheric air is sometimes trapped in such a manner as to form minute or small air pockets or voids and even minute air passages of limited length in the rubber material adjacent but exteriorly of the tubes, and that a good adhesive bond between the margins of the tubes and adjacent rubber material is sometimes lacking. The diffusion of inflating air through the tube walls results in enlarging the air pockets and passages and in greatly reduced flexing life of the marginal portions of the tubes and service life of the covering.

Another difficulty with the prior inflatable coverings utilizing the resilient natural rubber tubes with an internal coating of powdered soapstone or its equivalent, is that superimposed opposite portions of the tube wall will sometimes stick and become bonded together during vulcanization, and this necessitates either extensive repairs of the covering or scrapping the vulcanized covering, both of which are expensive and not economical.

Also, when the prior inflatable coverings were mounted on the leading edge of an airfoil and cyclically inflated, the in-rushing flow of inflating air blew loose soapstone particles to the same ends of adjacent tubes, thereby creating objectionable permanent bulges or humps in the end portions of the tubes. These humps produce objectionable turbulence of the flow of air over the covering and hence adversely affect the aerodynamic characteristics of the wings.

An object of the invention is to provide means for overcoming the foregoing and other disadvantages and difficulties of the prior inflatable protective coverings.

Other objects of the invention are to provide for increased service life of an inflatable protective covering; to provide for good bonding of the inflatable tubes to adjacent material of the covering; to provide for improved imperviousness and air-diffusion resistance of the walls of such tubes and for increased flexing life thereof, to provide for eliminating the enlargement of small voids and passages exteriorly of the tubes and for resisting the initial formation of such voids and passages in the covering during its use; to provide for resisting blowout and puncturing of the tubes, while facilitating maximum inflating distension and sharpness of outward curvature of the inflated tubes; to provide for reducing the quantity of soapstone in the tubes and for avoiding the formation of humps in the ends of the inflating tubes; and to provide for simplicity of construction, convenience of manufacture, and for effectiveness of operation.

These and other objects and advantages of the invention will be apparent from the following description.

In the accompanying drawings which constitute a part of this specification and in which like numerals are employed to designate like parts throughout the same, Fig. 1 is a view from above of an inflatable protective covering upon the leading edge of an airplane wing and constructed in accordance with and embodying the invention, Fig. 2 is a plan view of the inflatable protective covering "as molded" and before attachment to the wing, Fig. 3 is a cross-sectional view of an improved flattened inflatable tube for installation in the covering, Fig. 4 is a view like Fig. 3 but showing the tube fully distended and before installation in the covering, Fig. 5 is a cross-sectional view in an enlarged scale of the covering as assembled in plies for vulcanization, parts being broken away, Fig. 6 is a view like Fig. 5 but showing the covering with small voids therein after vulcanization, parts being broken away, Fig. 7 is a view like Fig. 5 but showing the covering after its vulcanization and after shrinkage of the fabric in the improved tubes, parts being broken away, and Fig. 8 is a cross-sectional view in an enlarged scale taken along line 8—8 in Fig. 2 of the vulcanized covering in its mounted condition showing one of its improved tubes fully inflated, parts being broken away.

The illustrative inflatable protective covering 15 shown in Figs. 1 to 8, inclusive, has a thin, flexible, sheet-like body including therein a plurality of inflatable passages or chambers or closed-end inflatable tubes 16, 16 with continuous annular walls including elastomeric material highly resistant to the diffusion of air therethrough. The covering 15 is capable of providing extended service life together with effective ice-removal, when adhesively mounted conformingly upon the leading edge of an airfoil 17 or aircraft wing as by a suitable known liquid rubber cement of the air-curing type.

The body of the covering 15 comprises vulcanizable elastic material such, for example, as resilient rubber, natural or synthetic, or other rubber-like or elastomeric material, and an attaching base 18 desirably of square-woven, straight-laid, cotton fabric thinly coated or otherwise treated on both sides with a resilient natural rubber composition. The inflatable tubes 16, 16 in a deflated, flattened disposition are adhered to and imbedded in the rubber material of the covering intermediate its thickness and may extend chordwise (laterally), or spanwise (longitudinally), or in part chordwise and in part spanwise of the covering.

For the particular construction shown, the flattened, inflatable tubes 16, 16, for example, of one (1) inch width or approximate diameter extend chordwise in side-by-side, closely adjacent, substantially parallel relation from a position adjacent one spanwise margin 19 to a position adjacent the other spanwise margin 19a and occupy the major part of the area of the covering. A pair of suitable size, flattened, tubular inflating manifolds 20, 21 extend side-by-side in the covering 15 desirably but not necessarily adjacent and along one spanwise margin 19 in superimposed, overlapping relation to and in communication with the inflatable tubes such that adjacent tubes can be inflated in alternation; and a pair of inflating connections 22, 23 are provided for communication with a suitable source of inflating air under pressure and inflation and deflation controls (not shown) carried by the airplane, so as to admit inflating air to and exhaust the same from the tubes 16, 16 through the manifolds 20, 21 and connections 22, 23.

Each inflatable tube 16 has its continuous annular wall comprising an elastomer 24 which has several times the resistance to diffusion of air as natural rubber and which has resilience and also resistance to stiffening at freezing temperature, and is capable of vulcanization. Suitable elastomers having these characteristics may be butyl rubber; brominated butyl rubber; chlorinated butyl rubber; mixtures of neoprene and butyl rubber; mixtures of brominated butyl rubber and natural rubber, or GR–S synthetic rubber, or neoprene, or butyl rubber; and mixtures of chlorinated butyl rubber and natural rubber, or GR–S synthetic rubber, or neoprene, or butyl rubber. Good results have been produced using a brominated butyl rubber composition 24 capable of vulcanization under heat and pressure, and compatible with natural rubber.

In respect of the foregoing diffusion-resistant elastomers 24, butyl rubber is described and claimed in U.S. Patents Nos. 2,322,073; 2,356,128; 2,356,129; 2,356,130; 2,373,706; 2,384,975 and 2,418,912. Brominated butyl rubber is described and claimed in U.S. Patent No. 2,631,984. Neoprene is a polymer of isoprene, namely 2-chlorobutadiene, while GR–S synthetic rubber is a butadiene styrene copolymer.

The continuous annular wall of the inflatable tube 16 has desirably an annular reinforcement 25 therein of flexible, elastically stretchable, textile fabric such, for example, as a thin, single thickness, tricot fabric of nylon, Dacron, cotton, fiber glass or other suitable filamentary material, as shown especially in Figs. 3 and 4, to resist blowout and to increase the flexing strength of the wall. Good results have been obtained with nylon tricot fabric having desirably a suitable resorcinol-formaldehyde treatment for increased flexing life and bonding purposes.

The continuous annular wall of the inflatable tube 16 may have a thin, continuous layer or coating of the same highly diffusion-resistant elastomeric composition 24 at both faces of the fabric reinforcement 25, or a continuous layer of a suitable but different highly diffusion-resistant elastomeric composition 24 at each of said faces; or it may have a continuous layer of a suitable highly diffusion-resistant elastomeric composition 24 at one of said faces and a continuous layer at the other face formed of an elastomeric composition 26 having a resistance to the diffusion of air equivalent to that of natural rubber and having resilience and also resistance to stiffening at freezing temperature and preferably well below freezing temperature such, for example, as minus 65 degrees F. The last mentioned layer may be a suitable, resilient, natural rubber composition 26 having the latter characteristics and capable of vulcanization. Each continuous layer may be of the same thickness (about .002″ to about .005″) and of a uniform thickness not exceeding that of the corresponding natural rubber layer used in prior ordinary tubes.

Tests of the embodiment of the invention shown in the drawings have indicated increased service life of the covering and greatly increased tube flexing life, when the preferred tube 16 construction, shown especially in Figs. 3 to 8, inclusive, has been utilized. In this construction each inflatable tube 16 includes an annular reinforcement 25 of thin, single thickness, nylon tricot fabric treated with resorcinol-formaldehyde, or a suitable adhesive, or both, and subsequently calendered, spread or otherwise treated to form a thin, continuous layer or coating of an elastomeric composition on both faces of the fabric, at least one of which layers is highly resistant to the diffusion of air. In the preferred construction, the layer or coating on one face of the tricot fabric is a suitable, vulcanizable, brominated butyl rubber composition 24 which constitutes the air-diffusion resistant, impervious, continuous, inner wall portion or lining of the tube 16; but the layer or coating on the other face of the tricot fabric is a suitable, vulcanizable, resilient, natural rubber composition 26 which constitutes the continuous, outer wall portion or cover of the tube 16.

For the preferred embodiment, a brominated butyl rubber composition is employed which has an air diffusion rate of 0.00013 cubic feet of air passing through a 1 ft. square sample 0.001 inch thick at 1 lb. pressure differential at 30° C. and 760 mm. of mercury pressure, which air diffusion rate is in the order of $\frac{1}{64}$ that of a natural rubber composition, the air diffusion rate of which is 0.00640 cubic feet of air passing through a 1 ft. square sample 0.001 inch thick at 1 lb. pressure differential at 30° C. and 760 mm. of mercury pressure. As mentioned above, elastomers other than brominated butyl having a high air diffusion rate may be employed. For example, neoprene which has an air diffusion rate in the order of about $\frac{1}{8}$ that of natural rubber, or ordinary butyl rubber which has an air diffusion rate in the order of about $\frac{1}{16}$ that of natural rubber, may be used in various mixtures with natural or GR–S rubber, so long as the air diffusion rate is at least about $\frac{1}{4}$ that of natural rubber alone.

Each tube 16 may be made in flattened form from a strip of nylon tricot fabric coated on both sides with the preferred elastomer and having a suitable width and a very thin covering of powdered soapstone on the exterior faces of the elastomeric coatings. The strip has its margins folded over so as to provide a continuous butt seam 27 which is reinforced by a suitable, thin, cotton fabric tape 28 friction coated with a suitable, resilient, natural rubber composition on both sides and adhesively attached to the outer surface of the wall of the tube 16, as shown especially in Figs. 3 and 4. The inner lining 24 may have a plurality of longitudinal ridges 16a extending the full length of the tube or extending a relatively short length only across the inflating manifolds 20, 21 to facilitate inflation of the tube 16. With the brominated butyl rubber inner lining tube construction only a relatively very small or nominal quantity of powdered soapstone is uniformly dispersed within the tube as compared to that used in a tube with a natural rubber inner lining; hence the problem of humps at the ends of the tubes is largely eliminated by the improved tube construction.

This particular tube construction and arrangement with the brominated butyl rubber, annular internal barrier or lining 24 prevents effectively diffusion of inflating air through the laminated wall of the tube 16 and the natural rubber outer cover or layer 26 facilitates good permanent bonding of the said wall of the tube 16 to the adjacent natural rubber composition in the body of the covering 15. Also, a good bond is produced between the nylon tricot fabric 25 and the respective thin layers or coatings 24, 26 on its faces, which is advantageous for increased flexing life and elastically controlled stretching of the wall of the tube 16, especially at its opposite, folded marginal portions. This construction by virtue of the good bond of the tube to adjacent natural rubber of the covering, provides increased resistance to the tearing loose of the marginal portions of the tube 16 from the underlying rubber composition and the fabric base 18 in the covering 15 despite severe flexing of the marginal portions under a multiplicity of repetitive inflations and deflations of the tube.

The inflatable protective covering 15 may be assembled in laminated form and flat condition, as shown in Fig. 5, and the fabric and rubber parts thereof integrally united as by vulcanization under heat and pressure to produce the unitary flat covering shown in Figs. 2, 6 and 7. The unvulcanized, assembled covering 15 shown in an enlarged scale in Fig. 5 for increased clarity, has a thin layer or ply 29 of suitable resilient, natural rubber composition overlyingly attached to the fabric attaching base 18 as by a known suitable liquid rubber cement. The flattened inflatable tubes 16, 16 including the natural rubber outer cover 26 (free of soapstone) and the brominated butyl rubber inner lining 24 are attached adhesively tape 28 first to the rubber layer 29. The tubes have the adjacent marginal portions 30, 31 of adjacent tubes 16, 16 desirably in closely adjacent, spaced-apart relation one to the other. A fillet strip 32 of suitable, resilient, natural rubber composition and preferably rectangular cross-section is positioned in and along the space between each pair of adjacent marginal portions 30, 31 and adhesively attached thereto. Rolling force is applied against and along the top of each fillet strip 32 so as to seat the bottom of the strip against the rubber layer 29 and to conform the sides of the strip to the generally curved contour of the adjacent marginal portions 30, 31 as by cold-flow of the unvulcanized, natural rubber composition of the strip.

It has been found that the fillet-rolling operation must be carefully done in order to obtain a continuous adhesive attachment of the fillet strip to the tubes 16, 16 and the rubber layer 29, and also in order to eliminate minute or small pockets or voids and minute or small passages of limited length in the spaces occupied by the fillet strips 32, 32, which voids and passages contain trapped air at atmospheric pressure. However, the desired good adhesive attachment of the fillet strips to the tubes may not always be obtained and the formation of such small voids and passages may and does sometimes occur, even though great care be exercised during the fillet-rolling operation. In Fig. 5, typical poor attachments of the fillet 32 to the marginal portions of the tubes are indicated by the numerals 33, 33, and typical minute pockets or voids and passages are indicated by the numerals 34, 35 and 36, which voids and passages are generally located adjacent the lower region of the single fold marginal portions of the tubes and adjacent the rubber layer 29 i.e. near or in the common plane of the bases of the flattened tubes. These initial defects are generally present in the finished, vulcanized covering (see Fig. 6) and are not visible nor readily detectable therein. It has been found that the minute voids and passages receive little or no air under pressure by diffusion of the inflating air through the tube wall with the brominated butyl rubber inner lining; hence enlargement of the voids and passages is substantially entirely avoided and increased flexing life of the tube especially at its marginal portions is facilitated.

When substantial shrinkage of the nylon tricot or other fabric in the tubes occurs during vulcanization, the fabric in the marginal portions of the flattened tubes is pulled away and separated from the adjacent rubber outer cover of the tubes, as shown in Fig. 7 and indicated by the numerals 38, 39 and 40. This also is not readily detected by visual inspection, and this separation substantially reduces the tube flexing life if there is any subsequent substantial volume build-up of pressurized air of diffusion in the separation zone. However, the harmful effect of all the foregoing defects is eliminated by the invention, if and whenever such defects are present in the improved inflatable cover 15 with the improved, air-diffusion resistant tubes 16, 16.

For resisting puncture and other failure of the tubes 16, 16 at their marginal regions of greatest flexing and stretching, while facilitating extensive outward distension of the tubes intermediate their marginal regions, the invention provides spaced-apart individual reinforcing strips 42, 42 of thin, square-woven, bias-cut, textile material, desirably cotton fabric, thinly friction coated on both sides with a suitable, resilient, natural rubber composition. Each reinforcing strip 42 has sufficient width so that it spans the space between and substantially overlaps the adjacent marginal portions 30, 31 of adjacent tubes 16, 16 when the reinforcing strip 42 is adhesively attached to and flush against the upper faces of said adjacent tubes and to the fillet strip 32, as shown in Fig. 5.

The plurality of spaced-apart reinforcing strips 42, 42, as compared to the prior continuous sheet reinforcement of substantially similar material overlying all the tubes, reduce the weight and increase the flexibility and distensibility of the covering, produce increased flexing movement and working in the outer elastic material of the covering in the narrow zones between adjacent tubes 16, 16 for improved ice-removal purposes. They facilitate sharp outward curvature of the upper wall portion of each tube in the region between its margins and the strips 42, 42 for effective ice-removal by the tubes, and also resist an objectionable amount of localized stretching and strain of the nylon tricot fabric 25 in the single fold marginal portions of the tubes, which localized stretching tends to weaken the fabric 25 and to shear the latter loose from the adjacent resilient rubber material surrounding the tubes.

A thin layer or ply 43 of suitable, resilient, natural rubber composition is superimposed upon and adhesively attached to the inflatable tubes 16, 16, the fillets 32, 32 and the reinforcing strips 42, 42, as shown in Fig. 5. A very thin, protective layer or ply 44 of suitable resilient neoprene composition is superimposed upon and adhesively attached to the layer 43, and a very thin, electrically conductive layer or ply 45 of a resilient natural rubber composition with particles of an electrically conductive substance such, for example, as carbon black therein is superimposed upon and united with the neoprene protective layer 44, as shown in Fig. 5, for static electricity removal purposes.

This completes the assembly of the covering which is next vulcanized to integrally unite the fabric and rubber parts, as shown in Figs. 6, 7 and 8, and if there be poor bonds 33, 33, and voids and passages 34 to 36, inclusive, initially in the assembly, then such defects are also generally present in the vulcanized covering 15, as shown in Fig. 6. Also, if substantial shrinkage of the nylon tricot fabric 25 in the tubes 16, 16 occurs during the vulcanization, such shrinkage breaks the attachment as at 38, 39 and 40 of the natural rubber outer cover 26 to the fabric 25 at the single fold marginal portions of the tubes 16, 16 in the vulcanized covering 15, as shown in Fig. 7. Nevertheless, the service life and the tube-flexing life of the improved covering 15 are in fact increased despite the presence of the foregoing defects largely by virtue of the air-diffusion resistant character of the walls of the inflatable tubes 16, 16. Also, such new results are provided by the improved covering 15, when it has none of the foregoing defects, because inflating air cannot diffuse through the tube walls and produce other related defects subsequently during operation of the covering.

In the preferred operation of the particular inflatable protective covering 15 in its mounted condition, adjacent inflatable tubes 16, 16 are inflated in alternation in a cyclical manner wherein each inflating cycle consists of one inflation and deflation of a chordwise-disposed tube. Upon admission of the inflating air at suitable pressure (for example, about 20 lbs. per square inch) into an inflatable tube 16, the tube distends from its flattened shape to an outwardly bulged shape in cross-section, as shown in Fig. 8, and because there is only a very small quantity of powdered soapstone in the butyl rubber lined tube, the in-rushing rapid flow of inflating air does not blow sufficient soapstone to the lower end of the tube to form an objectionable hump therein. Since the covering 15 is cemented throughout to and backed by the stiff metal skin of the leading edge of the wing 17, the inflating distension of the tube 16 occurs wholly outwardly away from the leading edge to provide an approximately semicircular shape in section of the tube.

It is to be noted that the lower wall portion and the tape 28 of the tube 16 are integrally bonded to the adjacent, underlying rubber material overlying the fabric base 18 in the covering 15; hence limited, elastic, lateral or circumferential stretching with minimum outward lifting takes place in the united nylon tricot fabric 25 and brominated butyl rubber inner lining 24 in said lower wall portion to facilitate maximum outward distension of the inflated tube 16 even at sub-zero temperatures. However, the upper wall portion of the tube 16 between its marginal portions 30, 31 and especially in the zone between the strips 42, 42, flexes and elastically stretches, laterally or circumferentially and extensively, by virtue of the flexibility and stretchability of the united nylon tricot fabric 25 and brominated butyl rubber inner lining 24 in said upper wall portion, to provide the desired sharply curved sectional shape and maximum outward distension of the inflated tube 16. The immediately adjacent resilient rubber material in the covering bonded to and overlying the tube 16 including said upper wall portion thereof also flexes and elastically stretches extensively so as to effect minimum restraint to the desired outward distension of the tube 16, as shown in Fig. 8.

The inflating distension of the tube 16 subjects each of its single fold marginal portions 30, 31 including the nylon tricot fabric 25 and the brominated butyl rubber inner lining 24 therein, to maximum and relatively greater flexing and stretching stresses as compared to those in the remainder of the tube wall, and produces controlled lifting and greatly increased radius of curvature in such marginal portions. The elastic stretchability of the resilient, natural rubber material adjacent and also that underlying the respective marginal portions 30, 31 facilitates such lifting and increased curvature of said portions.

The extensive lateral or circumferential stretching of the nylon tricot fabric 25 in the marginal portions 30, 31 produces high shearing stresses tending to break the bond between the fabric 25 and the adjacent natural rubber material, which breakage of the bond is objectionable because this facilitates tearing the marginal portions 30, 31 loose from the underlying base material of the covering, hence reduced strength at such marginal portions and ultimate failure of the covering. However, the inner lining 24 resists the diffusion of inflating air therethrough and through the fabric 25 to the zone of breakage, when such breakage occurs; thus, it substantially reduces the harmful effect of the breakage because it prevents the expansion of said zone due to the air-diffusion thereto and the accumulation of the inflating air under pressure in the zone which expansion facilitates further tearing of the marginal portions and lower wall portion of the tube loose from the underlying base material of the covering. Also, the inner lining 24 is highly resistant, especially at very low temperatures, to fatigue-failure and cracking despite the high stretching and flexing stresses in the marginal portions 30, 31, thereby maintaining its resistance to the diffusion of inflating air therethrough, thus facilitating increased flexing life of such portions.

The pair of reinforcing fabric strips 42, 42 adjacent and overlying the marginal portions 30, 31 effect a limited restraining influence through the intervening resilient rubber material upon the amount of stretching in the nylon tricot fabric 25 in the marginal portions 30, 31 so as to resist said breakage of the bond, while effecting little or no restraint to the distension and substantial stretching of the upper wall portion of the tube, especially at its zone between adjacent margins of adjacent strips 42, 42. The pair of reinforcing fabric strips 42, 42 flex with the marginal portions 30, 31 and the upper wall portion of the tube 16, and thereby compel working and stretching of the elastic material of the covering in its regions between adjacent spaced-apart tubes, as shown in Fig. 8, to facilitate effective removal of ice at said regions.

When the vulcanized covering 15 has the small voids and passages 34 to 36, inclusive, therein, as shown in Fig. 6, the inner lining 24 maintains its resistance to the diffusion of inflating air therethrough upon inflation of the tube 16, thereby preventing effectively the passage of such air by diffusion through the wall of the tube 16 and adjacent rubber material in the covering into said voids and passages. This eliminates the objectionable, relatively permanent expansion of the voids and passages; thus avoiding premature service failure of the covering and greatly reduced flexing-life of the marginal portions of the tubes and tearing of the margins 30, 31 of the tubes loose from the adjacent material and the underlying base material in the covering.

When the vulcanized covering 15 has the separation zones 38 to 40, inclusive, at the marginal portions 30, 31 of the tubes 16, 16, as shown in Fig. 7, due to the shrinkage of the nylon tricot fabric 25 in the walls of the tubes, the inner lining 24 maintains its resistance to the diffusion of inflating air therethrough upon inflation of the tube 16, thereby preventing effectively the passage of such air by diffusion into the separation zones 38 to 41, inclusive, so as to expand and enlarge the same. The pair of reinforcing strips 42, 42 by virtue of their attachment through the intervening, resilient, natural rubber material to the adjacent fabric 25, further resist an increase in size of the separation zones under inflation of the tube. Thus, the separation zones 38 to 41, inclusive, are maintained in their initial small size and do not cause substantial reduction in the flexure and flexing life of the marginal portions of the tubes nor promote tearing the marginal portions loose from the underlying base material in the covering.

When the improved covering 15 has neither voids and passages nor separation zones therein as shown in Fig. 8, the elastomeric inner lining 24 in each tube 16 maintains its high resistance to the diffusion of inflating air, thus preventing the gradual build-up of the inflating air in any weakly united areas and subsequently developed separation zones in the rubber material adjacent the wall of the tube, and the elastomeric inner lining 24 withstands the flexing and stretching stresses in the tube wall, especially at the marginal portions 30, 31, without cracking or otherwise failing, particularly at low temperatures. The resiliency of the inner lining 24 at and well below freezing temperature makes feasible the desired extensive flexing and stretching of the wall of the tube 16 and the provision of good inflating height and sharpness of curvature of the inflated tube for effective ice removal at high altitudes.

Tests have shown that the improved covering 15 avoids permanent humps in the ends of the tubes due to soapstone accumulation and is capable of withstanding successfully about 14,000 or more cycles of inflation at temperatures above and also substantially below freezing temperature, while providing good inflating height and distension of the tubes 16, 16. The walls of the tubes 16, 16 were found, at the conclusion of the tests, to be structurally sound and the adhesive bond between the nylon tricot fabric 25 and the adjacent, resilient, natural rubber, especially at the marginal portions 30, 31, was maintained without rupture. Like tests under like conditions show that the prior coverings with ordinary rubber tubes generally withstand only about 3,000 to 4,000 cycles of inflation, after which inflations the adhesive bond between the tube fabric and the adjacent rubber at the marginal portions of the tubes is ruptured resulting in unsatisfactory ice-removing operation of the prior covering. Thus, the improved covering 15 provides greatly increased service life and greatly increased flexing life of the tubes 16, 16 together with effective removal of ice.

Variations may be made without departing from the scope of the invention as defined in the following claims.

I claim:

1. Apparatus for preventing the accumulation of ice upon the leading edge of an airfoil, said apparatus comprising a flexible sheet-like protective covering including an elastomeric rubbery composition with an air diffusion rate in the order of that of natural rubber for mounting upon said leading edge, a plurality of inflatable passages in adjacent side-by-side relation in said covering each surrounded by said elastomeric rubbery composition thereof, means in communication with said inflatable passages for inflating and deflating the same to outwardly distend the covering to break and remove the ice thereon, said inflatable passages each having a continuous annular wall comprising a flexible fabric annular reinforcement of interlaced filamentary elements constructed and arranged to provide extensive elastic stretchability circumferentially of said wall and integrally united with the adjacent said elastomeric rubbery composition of the covering, and said continuous annular wall comprising an inner lining integrally united with said fabric annular reinforcement and formed of an elastomeric composition selected from the group consisting of butyl rubber compositions and their halogenated derivatives having an air diffusion rate in the order of $\frac{1}{16}$ to $\frac{1}{64}$ that of natural rubber, and an individual reinforcing strip of elastically stretchable fabric extending along each pair of adjacent margins of adjacent inflatable passages in overlying overlapping relation to narrow marginal portions only of the adjacent passages and imbedded in said elastomeric rubbery composition of the covering adjacent the passages in integrally united relation to the latter composition and to said marginal portions of said adjacent passages.

2. Apparatus for preventing the accumulation of ice upon the leading edge of an airfoil, said apparatus comprising a flexible sheet-like protective covering including an elastomeric rubbery composition with an air diffusion rate approximately equal that of natural rubber for mounting upon said leading edge, a plurality of inflatable tubular passages extending in adjacent side-by-side relation in said covering in the direction along a margin of the covering and each surrounded by said elastomeric rubbery composition, means in communication with said inflatable tubular passages for inflating and deflating the same to outwardly distend the covering to break and remove the ice thereon, said inflatable tubular passages each having a continuous annular wall comprising a flexible fabric annular reinforcement of interlaced filamentary textile elements constructed and arranged to provide extensive elastic stretchability circumferentially of said wall and integrally united with the adjacent said elastomeric rubbery composition of the covering, and said continuous annular wall comprising an inner lining integrally united with said fabric annular reinforcement and formed of an elastomeric composition selected from the group consisting of butyl rubber compositions and their halogenated derivatives having an air diffusion rate in the order of $\frac{1}{16}$ to $\frac{1}{64}$ that of natural rubber, an individual reinforcing strip of elastically stretchable fabric extending along each pair of adjacent margins of adjacent inflatable tubular passages in overlying overlapping relation to narrow marginal portions only of the adjacent passages and embedded in said elastomeric rubbery composition of the covering adjacent the passages in integrally united relation to the latter composition and to said marginal portions of said adjacent passages, and a continuous protective outer layer overlying all said inflatable tubular passages in spaced relation thereto and to the said individual reinforcing strips and integrally united with the elastomeric rubbery composition of the covering overlying said passages and said reinforcing strips and said outer layer comprising an elastomeric composition with an air diffusion rate in the order of $\frac{1}{8}$ that of natural rubber.

3. Apparatus for preventing the accumulation of ice upon the leading edge of an airfoil, said apparatus comprising a flexible sheet-like elongated protective covering including an elastomeric rubbery composition with an air diffusion rate approximately equal that of natural rubber for mounting upon said leading edge, a plurality of inflatable tubular passages extending in closely adjacent side-by-side relation in said covering and extending laterally of the covering and each surrounded by said elastomeric rubbery composition, means in communication with said inflatable tubular passages for inflating and deflating the same to outwardly distend the covering to break and remove the ice thereon, said inflatable tubular passages each having a continuous annular wall comprising a flexible elastic fabric annular reinforcement of interlaced filamentary textile elements with extensive elastic stretchability circumferentially of said wall and integrally united with the adjacent said elastomeric rubbery composition of the covering, and said continuous annular wall comprising an inner lining integrally united with said fabric annular reinforcement and formed of an elastomeric composition selected from the group consisting of butyl rubber compositions and their halogenated derivatives having an air diffusion rate in the order of $\frac{1}{16}$ to $\frac{1}{64}$ that of natural rubber, an individual reinforcing strip of elastically stretchable fabric extending along each pair of adjacent margins of adjacent inflatable tubular passages in overlying overlapping relation to narrow marginal portions only of the passages and imbedded in said elastomeric rubbery composition of the covering closely adjacent the passages in integrally united relation to the latter composition and to said marginal portions of said adjacent passages, and a continuous protective outer layer overlying all said inflatable tubular passages in spaced relation thereto and to the said individual reinforcing strips and integrally united with the elastomeric rubbery composition of the covering overlying said passages and said reinforcing strips and said outer layer comprising an elastomeric composition with an air diffusion rate in the order of $\frac{1}{8}$ that of natural rubber.

4. Apparatus for preventing the accumulation of ice upon the leading edge of an airfoil, said apparatus comprising a flexible sheet-like protective covering including an elastomeric natural rubber composition for mounting upon said leading edge, a plurality of inflatable tubes extending in side-by-side relation in said covering in the direction along a margin thereof with adjacent margins of adjacent tubes in closely adjacent relation one to the other and with each of said inflatable tubes surrounded by said natural rubber composition, means in communication with said inflatable tubes for inflating and deflating the same to outwardly distend the covering to break and remove the ice thereon, each inflatable tube including a continuous annular wall of elastomeric composition with a continuous annular reinforcement of single thickness elastically circumferentially stretchable knitted textile fabric intermediate the thickness of said wall of the tube, the latter said elastomeric composition at the outer circumferential face of said annular reinforcement being a natural rubber composition integrally united with said knitted textile fabric and the adjacent said natural rubber composition of the covering but said latter said elastomeric composition at the inner circumferential face of said annular reinforcement being a halogenated butyl rubber composition integrally united with said knitted textile fabric and having an air diffusion rate within the range of about $\frac{1}{16}$ to about $\frac{1}{64}$ that of natural rubber, an individual reinforcing strip of elastically stretchable fabric extending along each pair of adjacent margins of adjacent inflatable tubes in overlying overlapping relation to narrow marginal portions only of the adjacent tubes and embedded in said elastomeric natural rubber composition of the covering adjacent the tubes in integrally united relation to the latter composition and to said marginal portions of said adjacent tubes, and a continuous protective outer layer overlying all said inflatable tubes in spaced relation thereto and to said individual reinforcing strips and integrally united with said natural rubber composition of the covering overlying said tubes and said reinforcing strips and said outer layer comprising an elastomeric composition with an air diffusion rate in the order of ⅛ that of natural rubber.

5. Apparatus as defined in claim 4 in which said halogenated butyl rubber composition at the inner circumferential face of said annular reinforcement in said wall of each of said inflatable tubes is a brominated butyl rubber composition with an air diffusion rate in the order of 1/64 that of natural rubber, and said annular reinforcement is a knitted nylon fabric, and said protective outer layer of the covering is an elastomeric neoprene composition with an air diffusion rate in the order of ⅛ that of natural rubber.

6. Apparatus for preventing the accumulation of ice upon the leading edge of an airfoil, said apparatus comprising a flexible sheet-like protective covering including an elastomeric natural rubber composition for mounting upon said leading edge, a plurality of inflatable tubes extending in side-by-side relation in said covering in the direction along a margin thereof with adjacent margins of adjacent tubes in closely adjacent relation one to the other and with each of said inflatable tubes surrounded by said natural rubber composition, means in communication with said inflatable tubes for inflating and deflating the same to outwardly distend the covering to break and remove the ice thereon, each inflatable tube including a continuous annular wall of elastomeric composition with a continuous annular reinforcement of single thickness elastically circumferentially stretchable knitted nylon fabric intermediate the thickness of said wall of the tube, the latter said elastomeric composition at the outer circumferential face of said annular reinforcement being a natural rubber composition integrally united with said knitted nylon fabric and the adjacent said natural rubber composition of the covering but said latter said elastomeric composition at the inner circumferential face of said annular reinforcement being a brominated butyl rubber composition integrally united with said knitted nylon fabric and having an air diffusion rate in the order of 1/64 that of natural rubber, an individual reinforcing strip of square-woven bias-laid textile fabric extending along each pair of adjacent margins of adjacent inflatable tubes in overlying overlapping relation to narrow marginal portions only of the tubes and imbedded in said natural rubber composition of the covering closely adjacent the tubes in integrally united relation to the latter composition and to said marginal portions of said adjacent inflatable tubes, and a continuous protective outer layer overlying all said inflatable tubes in spaced relation thereto and to the said individual reinforcing strips and integrally united with said natural rubber composition of the covering overlying said tubes and said reinforcing strips and said outer layer comprising an elastomeric composition with an air diffusion rate in the order of ⅛ that of natural rubber.

References Cited in the file of this patent

UNITED STATES PATENTS

| | | |
|---|---|---|
| 2,342,979 | Spicer | Feb. 29, 1944 |
| 2,393,496 | Stedman | Jan. 22, 1946 |
| 2,440,240 | Atonson | Apr. 27, 1948 |
| 2,446,328 | Heston | Aug. 3, 1948 |
| 2,536,739 | Greene | Jan. 2, 1951 |
| 2,741,267 | McKinley | Apr. 10, 1956 |